(12) United States Patent
Park et al.

(10) Patent No.: US 8,717,458 B2
(45) Date of Patent: May 6, 2014

(54) UPDATING GAIN VALUES USING AN IMAGE PROCESSING METHOD FOR DIGITAL APPARATUS

(75) Inventors: Soo Jin Park, Seoul (KR); K. S. Krishna, Karnataka (IN); Babu K. Manohar, Karnataka (IN)

(73) Assignee: LG Innotek Co., Ltd., Seoul (KR)

( * ) Notice: Subject to any disclaimer, the term of this patent is extended or adjusted under 35 U.S.C. 154(b) by 29 days.

(21) Appl. No.: 13/599,622

(22) Filed: Aug. 30, 2012

(65) Prior Publication Data

US 2013/0050580 A1 Feb. 28, 2013

(30) Foreign Application Priority Data

Aug. 30, 2011 (KR) ........................ 10-2011-0087395

(51) Int. Cl.
*H04N 5/228* (2006.01)
*H04N 5/235* (2006.01)
*G06K 9/00* (2006.01)

(52) U.S. Cl.
USPC ...................... 348/222.1; 348/229.1; 382/167

(58) Field of Classification Search
USPC ........... 348/221.1, 223.1, 255, 362–368, 655; 382/167
See application file for complete search history.

(56) References Cited

U.S. PATENT DOCUMENTS

| | | | |
|---|---|---|---|
| 7,643,068 B2 | 1/2010 | Hyodo | |
| 8,111,302 B2 | 2/2012 | Ajito | |
| 8,212,890 B2 | 7/2012 | Nomura | |
| 2007/0047803 A1* | 3/2007 | Nikkanen | 382/162 |
| 2008/0292184 A1 | 11/2008 | Park et al. | |
| 2009/0060377 A1* | 3/2009 | Chen et al. | 382/270 |
| 2009/0060379 A1* | 3/2009 | Manabe | 382/274 |
| 2013/0222414 A1* | 8/2013 | Ito et al. | 345/600 |

FOREIGN PATENT DOCUMENTS

| | | |
|---|---|---|
| JP | 11-308634 A | 11/1999 |
| JP | 2004-007181 A | 1/2004 |
| JP | 2004-274367 A | 9/2004 |
| JP | 2006-222672 A | 8/2006 |
| JP | 2008-141732 A | 6/2008 |
| JP | 2009-147440 A | 7/2009 |
| JP | 2010-213213 A | 9/2010 |
| JP | 2011-049720 A | 3/2011 |

OTHER PUBLICATIONS

Notice of Allowance dated Feb. 22, 2013 in Korean Application No. 10-2011-0087395, filed Aug. 30, 2011.
Notice of Allowance dated Sep. 24, 2013 in Japanese Application No. 2012-190398, filed Aug. 30, 2012.

* cited by examiner

*Primary Examiner* — Mekonnen Dagnew
(74) *Attorney, Agent, or Firm* — Saliwanchik, Lloyd & Eisenschenk

(57) ABSTRACT

Disclosed is an image processing method. The image processing method includes forming a reference division line to perform white balance, forming a grid including a pixel distribution degree based on the reference division line, extracting a red gain value, a blue gain value, and the pixel distribution degree with respect to a specific point on the reference division line, determining if the extracted pixel distribution degree is a maximum point, and setting new gain values by using the extracted red gain value and the extracted blue gain value depending on if the pixel distribution degree is the maximum point.

8 Claims, 6 Drawing Sheets

FIG. 1

UPDATING GAIN VALUES USING AN IMAGE PROCESSING METHOD FOR DIGITAL APPARATUS

CROSS-REFERENCE TO RELATED APPLICATION

This application claims the benefit under 35 U.S.C. §119 of Korean Patent Application No. 10-2011-0087395, filed Aug. 30, 2011 which is hereby incorporated by reference in its entirety.

BACKGROUND

The disclosure relates to an image processing method for white balance. In particular, the disclosure relates to an image processing method capable of improving image quality by updating gain values according to reference division lines on a GRGB grid and performing bounding using the final gain value obtained according to the update.

Recently, as image technologies based on cameras and video devices have been developed, automatic adjusting technologies such as an automatic focusing (AF) scheme, an automatic exposure (AE) scheme, and an automatic white balance (AWB) scheme have been required to obtain superior image quality under various environments.

White balance is a process of removing unrealistic color casts so that an object, which is shown as a white object to a user, is represented as a white object in a photo or a picture.

A camera must perform the white balance by taking the color temperature of a light source into consideration, and the white balance depends on the relative coolness or relative warmth of the light source.

Human eyes can determine a white color under various light sources. However, digital cameras frequently have great difficulty with the auto white balance (AWB) because the human eyes and image sensors provided in the digital cameras make differences in characteristics and sensitivity thereof.

If the white balance is incorrectly performed, unsightly blue, orange, or even green color casts are caused. Accordingly, an unrealistic result, in extreme case, a fatal result may be caused in the picture.

For example, as the temperature of a light source is increased, a blue color is more expressed. In contrast, as the temperature of the light source is decreased, a red color is more expressed. The white balance refers to a technology, in which the balance between the blue and red colors is adjusted approximately to the color state of natural light so that the color distortion is removed.

Meanwhile, color temperatures represent the spectrum of light radiated from an ideal blackbody having the surface temperature, and represent the surface temperature calculated as numeric values.

The blackbody refers to an ideal object that only absorbs light, and neither reflects light nor transmits light. The range of the color temperatures may vary depending on the types of light sources as shown in following table 1.

TABLE 1

| Color Temperature | Light Source |
|---|---|
| 1000-2000 K | Candlelight |
| 2500-3500 K | Tungsten Bulb(household variety) |
| 3000-4000 K | Sunrise/Sunset(dear sky) |
| 4000-5000 K | Fluorescent Lamps |
| 5000-5500 K | Electronic Flash |
| 5000-6500 K | Daylight with Clear Sky(sun overhead)) |
| 6500-8000 K | Moderately Overcast Sky |

BRIEF SUMMARY

The disclosure provides an image processing method and an image processing device, capable of simply and accurately performing a white balance.

Meanwhile, the embodiments are not limited to the above object, and those skilled in the art can clearly understand other objects from following description.

According to the embodiments, there is provided an image processing method including forming a reference division line to perform white balance, forming a grid including a pixel distribution degree based on the reference division line, extracting a red gain value, a blue gain value, and the pixel distribution degree with respect to a specific point on the reference division line, determining if the extracted pixel distribution degree is a maxim point, and setting new gain values by using the extracted red gain value and the extracted blue gain value depending on if the pixel distribution degree is the maximum point.

In addition, the image processing method further includes applying a preset weighted value to the extracted red and blue gain values, and the new gain values are set based on the red and blue gain values to which the preset weighted value is applied.

In addition, the setting of the new gain values includes storing the red and blue gain values, to which the weighted value is applied, if the pixel distribution degree is the maximum point, and updating preset red and blue gain values by using the stored red and blue gain values.

In addition, the image processing method further includes changing the specific point within the reference division line if the pixel distribution degree is not the maximum point.

In addition, the image processing method further includes updating a present gain value if the specific point is a last point, and changing the specific point within the reference division line if the specific point is not the last point.

In addition, the weighted value is set based on a color temperature corresponding to the point.

In addition, the weighted value is variously set depending on a color temperature of an object.

In addition, the updating of the preset red and blue gain values by using the stored red and blue gain values comprises setting the new gain values based on "present gain value+ (present gain value−previous gain value)/(present gain value+previous gain value)", in which the present gain value include the stored blue gain value or the stored red gain value Further, the grid is formed based on a pixel distribution degree corresponding to a specific red gain value and a specific blue gain.

In addition, the forming of the reference division line to perform the white balance includes forming the reference division line by using a bounding box obtained from a Macbeth chart.

The determining if the extracted pixel distribution degree is the maxim point is made depending on if the pixel distribution degree of the red and blue gain values is equal to or greater than a preset reference value, or a variation characteristic representing that the pixel distribution is increased and then decreased.

As described above, according to the disclosure, the clear image can be acquired by accurately performing a white balance scheme.

Meanwhile, other effects will be directly or indirectly disclosed in the following detailed description.

BRIEF DESCRIPTION OF THE DRAWINGS

FIG. 1 is a view showing a Bayer color filter array;

DETAILED DESCRIPTION

Figure 2:
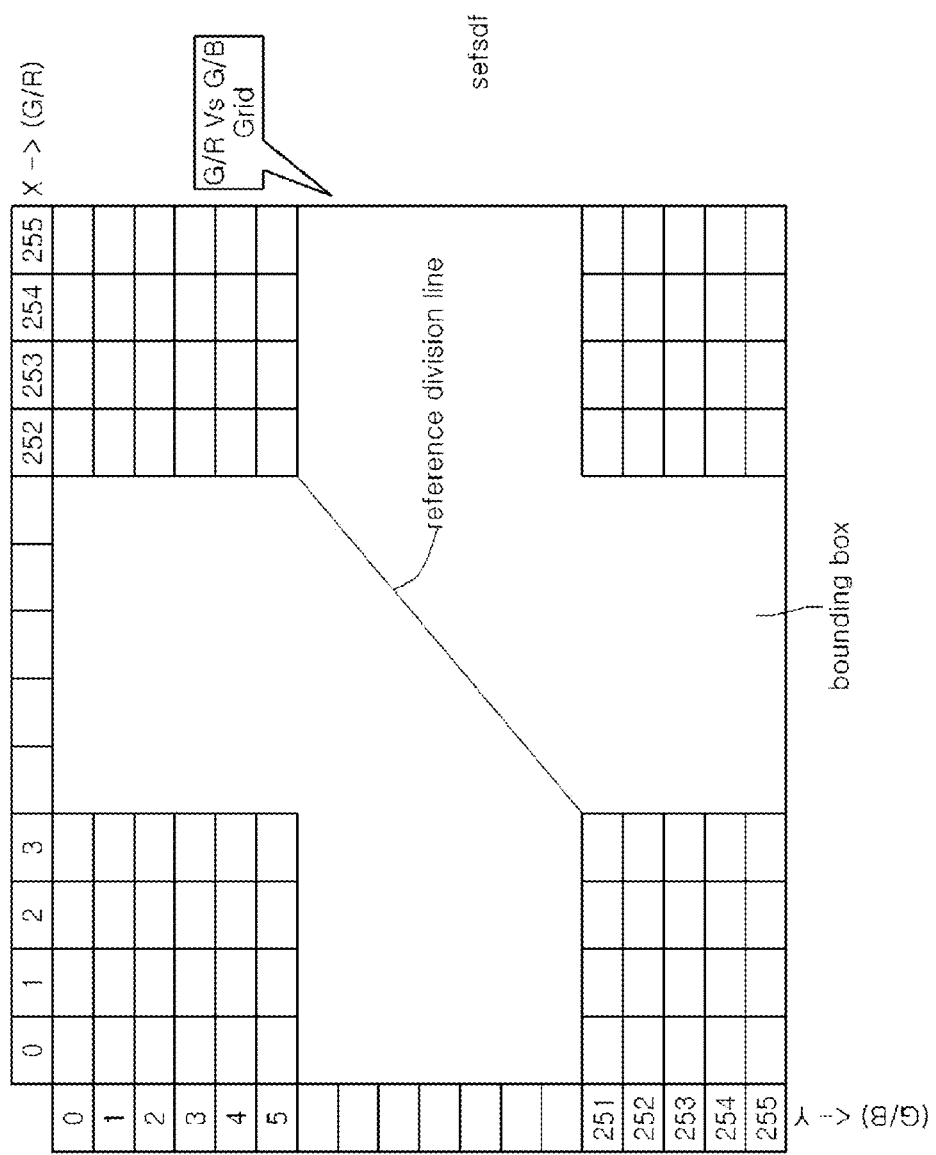
FIG. 2 is a view showing a GRGB grid.

The disclosure can be various modified and have various embodiments. Accordingly, specific embodiments are illustrated in drawings and will be described in detail.

However, it should be understood to those skilled in the art that the disclosure is not limited to the specific embodiment, but includes all modifications, equivalents, and alternatives of the specific embodiment within the spirit and the technical scope of the disclosure.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention. Similarly, the second component may be named as the first component. In addition, the term "and/or" refers to the combination of components having the meaning of the plural number or one of the components.

Exemplary embodiments of the disclosure will be described in more detail with reference to accompanying drawings. In the following description, the same reference numerals will be assigned to the same components for the obvious comprehension of the embodiment, and the same components will not be repeatedly described in order to avoid redundancy.

In general, a Macbeth chart represents reference colors that may be obtained under the condition of different color temperatures such as 2,300 K, 2,800 K, 3,000 K, 3,400 K, 5,000K and 6,500 K.

The Macbeth chart is a color chart obtained by correcting red and blue colors of light sources having different color temperatures for the purpose of white balance. The corrected values are reflected on a plurality of polygonal bounding boxes including all white points corresponding to different light sources.

The polygonal bounding boxes may be formed by setting the reference division lines based on sets of points and bi-directionally expanding the reference division lines by a search width. In addition, the Macbeth chart is variously used in image processing for color correction.

According to an image processing method according to one embodiment of the disclosure, white balance is performed with respect to RGB values of pixels that are obtained from an image sensor. In addition, the RGB values of the pixels may be configured in the form of a Bayer color filter array.

The Bayer color filter array is a color filter array for arraying RGB color filters on a square grid of a photo-sensor, and named after the name, Bryce Bayer, of the inventor thereof.

Figure 1:
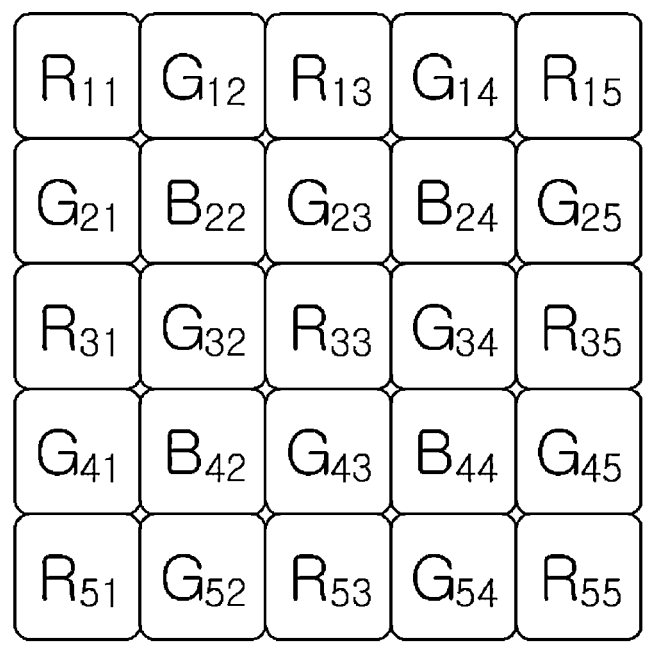

The Bayer color filter array is configured as array having a mosaic form. As shown in FIG. 1, the RGB color filters are distributed on the color filter array in the ratio of 25%, 50%, and 25%, respectively, so that RGB colors can be sensed according to the pixels.

In addition, according to the Bayer color filter array, G/R and G/B values can be calculated by using R, G, and B values obtained according to the pixels.

In addition, according to the Bayer color filter array, a G/R vs G/B grid plane of FIG. 2 may be formed by using the calculated G/R and G/B values.

According to the disclosure, the G/R value and the G/B value represent a red gain value and a blue gain value, respectively.

Meanwhile, the G/R vs G/B grid plane of FIG. 2 can be formed with respect to image pixels based on the Bayer color filter array by employing one dimension of the plane as an x axis representing the red gain value, $G/R=((Gr+Gb)/2)/R$, and another dimension of the plane as a y axis representing the blue gain $G/B=((Gr+Gb)/2)/B$.

In other words, the G/R vs G/B grid plane represents the distribution of pixels corresponding to the G/R value and the G/B value.

According to the disclosure, the G/R and G/B values are multiplied by 100 for the convenience of storage, and results may be calculated by restricting the results to 255 if the results exceed 255.

As shown in FIG. 2, a polygonal box including pixels corresponding to G/R and G/B values within the specific range is formed, and the polygonal box may be a bounding box.

The disclosure suggests a method of calculating the optimal blue and red gain values from the grid in the related bounding box.

The reference division line of FIG. 2 is used to calculate blue and red gain values depending on the movement of points according to one embodiment of the disclosure.

Figure 3:
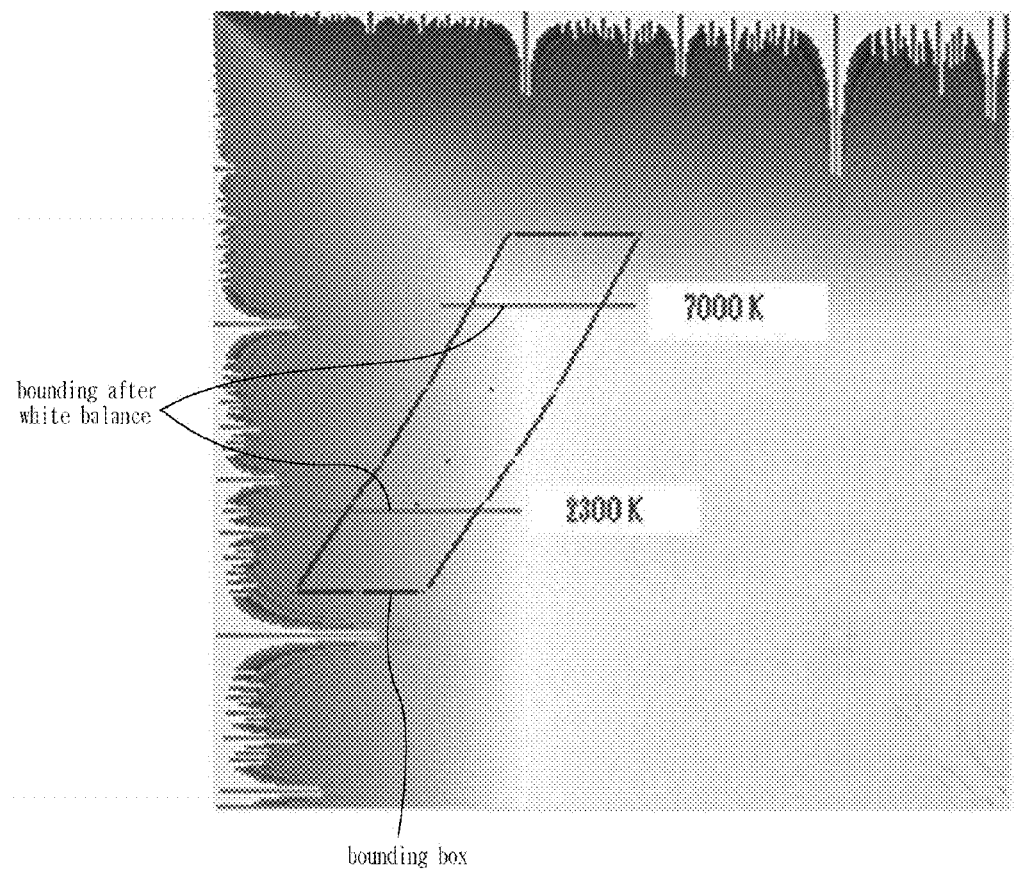
FIG. 3 is a view showing color temperature distribution on the GRGB grid.

Meanwhile, the bonding boxes shown on the GRGB grid of FIG. 2 may include a specific color temperature, and color temperatures may be distributed as shown in FIG. 3.

Figure 4:
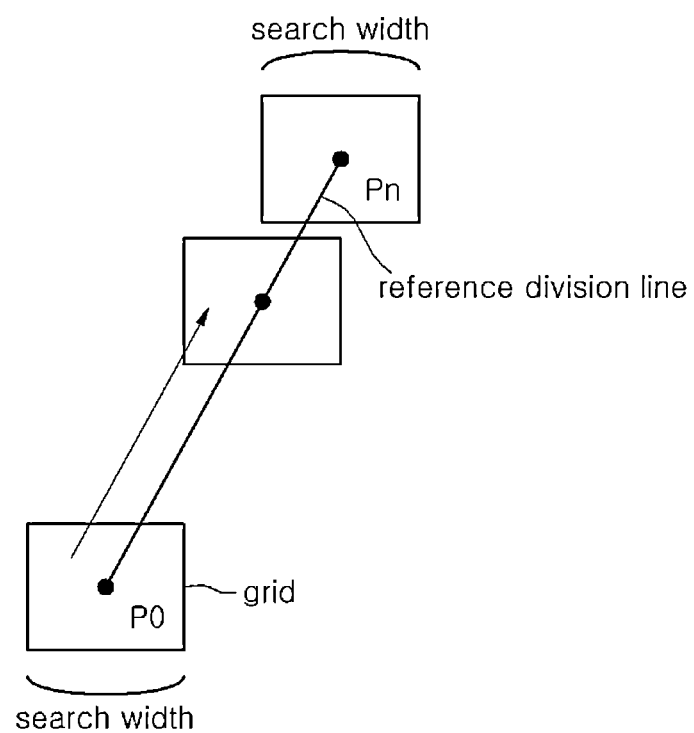
FIG. 4 is a view showing a process of calculating red and blue gain values.

FIG. 4 is a view showing a process of calculating the red and blue gain values.

First, the Macbeth chart, in which blue and red corrections have been performed based on the different color temperatures, may be used in order to calculate the red and blue gain values. Next, white balance may be performed with respect to each point while moving along the reference division line of the GRGB grid of FIG. 2.

In other words, as shown in FIG. 4, the white balance may be performed with respect to points P0 to Pn existing on the reference division line of the GRGB grid, and a grid having a predetermined search width about each point may be the base of the white balance.

In this case, each grid may have the shape of a rectangle formed about each of the points P0 to Pn of the reference division line. In addition, the search width and the number of data constituting the rectangle within the grid is not limited.

Hereinafter, the process of calculating red and blue gain values along the reference division line by using the GRGB grid of table 2 will be described.

In table 2, the horizontal axis represents the G/R value, and the vertical axis represents the G/B value.

TABLE 2

|   | 1  | 2  | 3   | 4  |
|---|----|----|-----|----|
| 1 | 25 | 5  | 6   | 0  |
| 2 | 5  | 7  | 8   | 79 |
| 3 | 45 | 67 | 56  | 6  |
| 4 | 29 | 90 | 123 | 56 |
| 5 | 4  | 8  | 98  | 78 |

Next, Table 3 may be obtained by multiplying the values according to pixels of table 2 by the x-axis values (1, 2, 3, and 4) serving as red gain values.

TABLE 3

| 25 | 10  | 18  | 0   |
|----|-----|-----|-----|
| 5  | 14  | 24  | 316 |
| 45 | 134 | 168 | 24  |
| 29 | 180 | 369 | 224 |
| 4  | 16  | 294 | 312 |

Next, Table 4 may be obtained by multiplying the values according to the pixels of table 2 by the y-axis values (1, 2, 3, 4, and 5) serving as blue gain values.

TABLE 5

| 25  | 5   | 6   | 0   |
|-----|-----|-----|-----|
| 10  | 14  | 16  | 158 |
| 135 | 201 | 168 | 18  |
| 116 | 360 | 492 | 224 |
| 20  | 40  | 490 | 390 |

The new values in Tables 3 and 4 are obtained by multiplying a pixel distribution degree by specific gain values.

In other words, the new values of Table 3 are obtained by multiplying the pixel distribution degree by the red gain values, and the new values of Table 4 are obtained by multiplying the pixel distribution degree by the blue gain values.

In addition, the new values of Tables 3 and 4 are values that have been more affected by the related gain values (the blue gain value or the red gain value).

In addition, as shown in the calculating process for Tables 3 and 4, the G/R value and the G/B value of Table 2 serve as weighted values with respect to the affected values.

Subsequently, all values of Tables 3 and 4 are added up.

In other words, the first sum of the values of Table 3 may be 2211, the second sum of the values of Table 4 may be 2888, and the third sum of the values of Table 2 may be 795.

Thereafter, the first sum and the third sum are divided by the second sum.

In this case, if the first sum is divided by the third sum, the result is '2,781 . . . '. If the second sum is divided by the third sum, the result is '3.632 . . . '.

In addition, values obtained through the above operation may be used as new red and blue gain values.

In other words, the '2.781 . . . ' may be used as the new red gain value, and the '3.632 . . . ' may be used as the new blue gain value.

In addition, a determination is made regarding if the distribution degree of a pixel corresponding to the new red and blue gain values may serve as the maximum point in Table 2.

Figure 5:
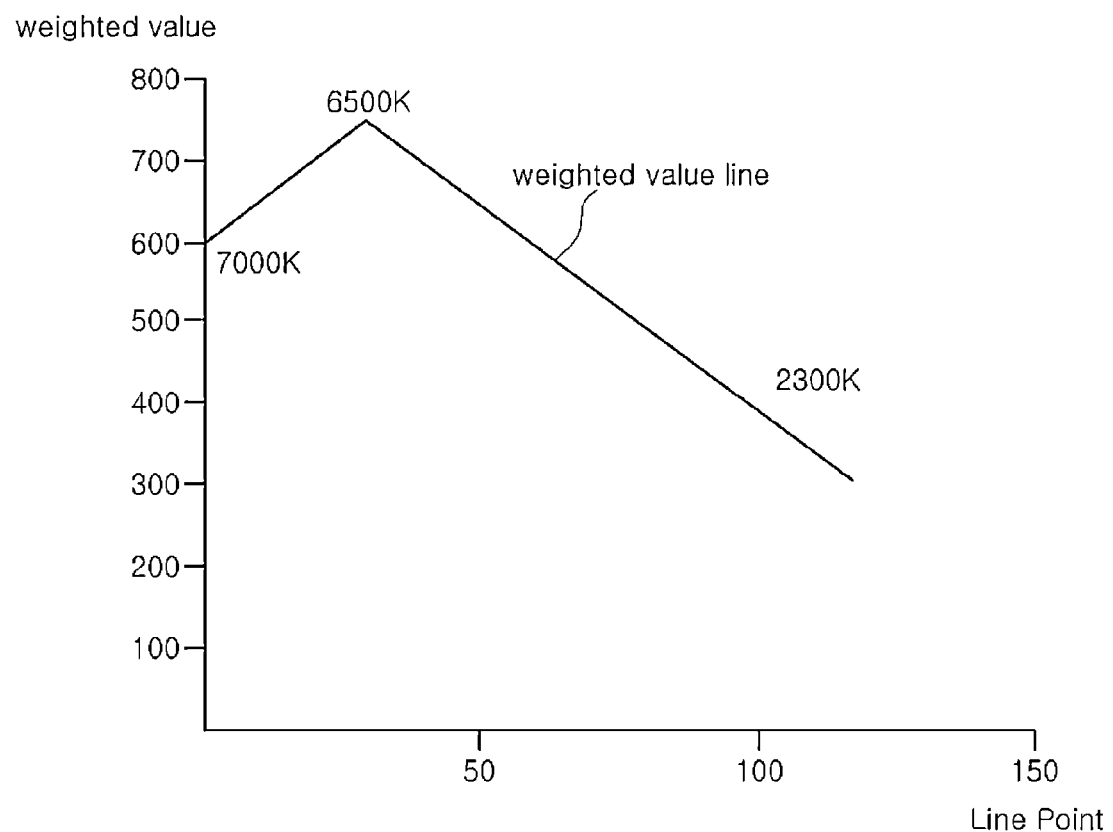
FIG. 5 is a graph showing a process of extracting the maximum point according to one embodiment of the disclosure.

FIG. 5 is a graph showing a process of extracting the maximum point according to one embodiment of the disclosure.

Referring to FIG. 5, a specific point on a horizontal axis may be multiplied by a weighted value on a vertical axis. Meanwhile, weight values may be differently applied to the specific point based on color temperatures. As shown in FIG. 5, the maximum weighted value is applied at the color temperature of 6,500 K, and lower weighted values are applied at the color temperatures lower than or higher than 6, 500K.

For example, a weighted value applied to the red gain value may be gradually increased, and a weighted value applied to the blue gain value may be reduced under the condition of daylight. In other words, weighted values according to the color temperatures may be varied according to the conditions of extracting images, for example, the color temperature of an object.

When weighted values of FIG. 5 are applied to new red and blue gain values calculated based on Tables 2 to 4, gain values for a present point are calculated.

A determination may be made regarding if pixel distribution related to the new gain values for the present point represents the maximum pixel distribution.

The determination regarding if the related gain value represent the maximum point may be made depending on if the pixel distribution of the related gain value exceeds a predetermined value, or if the pixel distribution for the gain value is increased and then decreased.

Meanwhile, if the gain value for the present point represents the maximum distribution, the present point may be stored as a present gain value.

The gain value of each point on the reference division line may be calculated to the last point of the reference division line. If the calculation of the gain value to the last point has been finished, the gain value may be updated by using the present gain value stored in the initial stage, and the grid may be bounded by using the gain value.

The updated gain value may be set as shown in a following Equation.

Updated gain value=present gain value+(present gain value−previous gain value)/(present gain value+previous gain value)  Equation After the final gain value has been obtained, only a region of a grid including the gain value can be extracted, and each grid may include only a grid extracted at the color temperature in the range of 2,300 K to 7,000 K as shown in FIG. 3. Accordingly, an image having a reduced color cast can be obtained.

Figure 6:
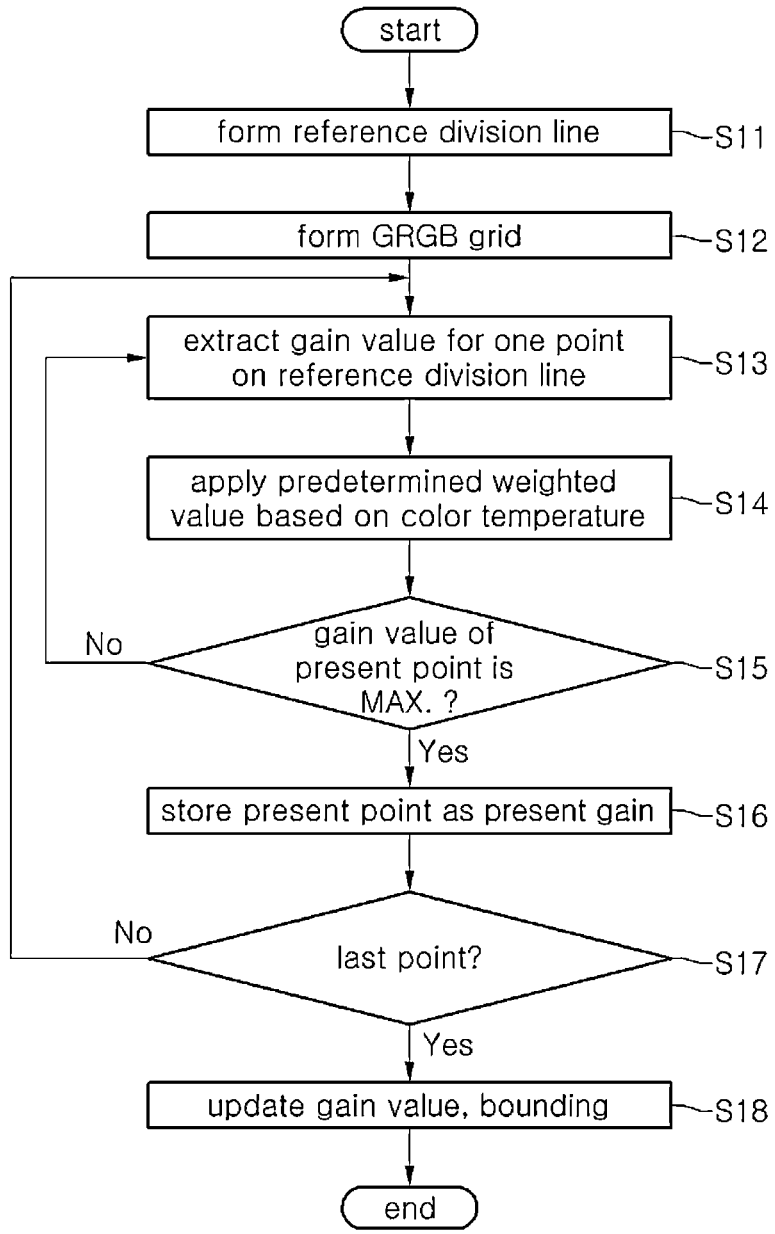
FIG. 6 is a flowchart showing an image processing method according to one embodiment of the disclosure.

FIG. 6 is a flowchart showing an image processing method according to one embodiment of the disclosure.

In step S11, reference division lines are formed by using bounding boxes obtained from the Macbeth chart.

In step S12, a grid is formed with respect to each point of the reference division line.

In step S13, red and blue gain values and a pixel distribution degree are extracted within the grid corresponding to each point. New red and blue gain values have been described the detailed description of Tables 2 and 4. The pixel distribution corresponding to the new red and blue gain values is calculated.

In step S14, weighted values are applied to the new red and blue gain values calculated in step S13 based on color temperatures.

In step S15, a determination is made regarding if the gain values represents the maximum pixel distribution with respect to a point, to which the weighted value is applied.

In step S16, the present point is stored as a present gain value if the present point represents the maximum pixel distribution in step S15.

If the present point does not represent the maximum pixel distribution in step S15, the operations of steps S13 and S15 are repeated with respect to a next point on the reference division line.

In step S17, a determination is made regarding if the present point is the last point, and the operations of steps S13 and S15 are repeated if the present point is not the last point.

In step S18, if the present point is the last point, the gain value is updated by using the final gain value and the grid is bounded.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An image processing method comprising:
    forming a reference division line to perform white balance;
    forming a grid including a pixel distribution degree based on the reference division line;
    extracting a red gain value, a blue gain value, and the pixel distribution degree with respect to a specific point on the reference division line;
    determining if the extracted pixel distribution degree is a maximum point; and
    setting new gain values by using the extracted red gain value and the extracted blue gain value if the pixel distribution degree is the maximum point;
    applying a preset weighted value to the extracted red and blue gain values, wherein the new gain values are set based on the red and blue gain values to which the preset weighted value is applied;
    wherein the setting of the new gain values comprises: storing the red and blue gain values, to which the weighted value is applied, if the pixel distribution degree is the maximum point; and updating preset red and blue gain values by using the stored red and blue gain values, wherein the updating of the preset red and blue gain values by using the stored red and blue gain values comprises setting the new gain values based on "present gain value +(present gain value −previous gain value)/(present gain value +previous gain value)," in which the present gain value includes the stored blue gain value or the stored red gain value.

2. The image processing method of claim 1, further comprising changing the specific point within the reference division line if the pixel distribution degree is not the maximum point.

3. The image processing method of claim 1, further comprising:
    updating a present gain value if the specific point is a last point; and
    changing the specific point within the reference division line if the specific point is not the last point.

4. The image processing method of claim 1, wherein the weighted value is set based on a color temperature corresponding to the specific point.

5. The image processing method of claim 4, wherein the weighted value is variously set depending on a color temperature of an object.

6. The image processing method of claim 1, wherein the grid is formed based on the pixel distribution degree corresponding to a specific red gain value and a specific blue gain value.

7. The image processing method of claim 1, wherein the forming of the reference division line to perform the white balance comprises forming the reference division line by using a bounding box obtained from a Macbeth chart.

8. The image processing method of claim 1, wherein the determining if the extracted pixel distribution degree is the maximum point is obtained depending on if the pixel distribution degree of the red and blue gain values is equal to or greater than a preset reference value, or depending on a variation characteristic representing that the pixel distribution is increased and then decreased.

* * * * *